US010161758B2

(12) United States Patent
Hiestermann et al.

(10) Patent No.: US 10,161,758 B2
(45) Date of Patent: Dec. 25, 2018

(54) METHOD FOR CREATING SPEED PROFILES FOR DIGITAL MAPS

(75) Inventors: Volker Hiestermann, Laatzen (DE); Robert Joannes Van Essen, Amsterdam (NL); Edwin Bastiaensen, Beersel (BE); Stephen T'Siobbel, Merelbeke (BE)

(73) Assignee: TOMTOM GLOBAL CONTENT B.V., Amsterdam (NL)

( * ) Notice: Subject to any disclaimer, the term of this patent is extended or adjusted under 35 U.S.C. 154(b) by 476 days.

(21) Appl. No.: 13/144,949

(22) PCT Filed: Jan. 13, 2010

(86) PCT No.: PCT/EP2010/050364
§ 371 (c)(1),
(2), (4) Date: Sep. 6, 2011

(87) PCT Pub. No.: WO2010/081837
PCT Pub. Date: Jul. 22, 2010

(65) Prior Publication Data
US 2011/0307165 A1 Dec. 15, 2011

(30) Foreign Application Priority Data

Jan. 16, 2009 (GB) .................................. 0900659.4
Jan. 16, 2009 (GB) .................................. 0900678.4

(51) Int. Cl.
*G01C 21/34* (2006.01)
*G01C 21/32* (2006.01)

(52) U.S. Cl.
CPC ......... *G01C 21/3469* (2013.01); *G01C 21/32* (2013.01); *G01C 21/3492* (2013.01); *Y02D 30/20* (2018.01)

(58) Field of Classification Search
CPC ..... G01C 21/3469; G01C 21/32; Y02B 60/42
(Continued)

(56) References Cited

U.S. PATENT DOCUMENTS 6,061,625 A 5/2000 Fastenrath
6,178,374 B1 1/2001 Moehlenkamp et al.
(Continued)

FOREIGN PATENT DOCUMENTS

EP 1 172 631 A1 1/2002
EP 1172631 A1 1/2002
(Continued)

OTHER PUBLICATIONS

International Search Report dated Jul. 22, 2010 from International Patent Application PCT/EP2010/050364, the ISA was the EPO.
(Continued)

*Primary Examiner* — Kimberly S Berona
*Assistant Examiner* — Jordan S Fei

(57) ABSTRACT

Probe data collected at times of low traffic density is analyzed to derive a Raw Road Design Speed Limit (RRDSL, 16) for each road segment or group of segments in a digital map. The RRDSL (16), comprised of longitudinally distributed speeds, is associated with the road segment and stored in a digital medium to indicate the limits of the road section in free flow traffic. The longitudinally distributed speeds may be limited by local speed limits or other business logic to establish a Legal Raw Road Design Speed Limit (LRRDSL, 17). Either the RRDSL (16) or the LRRDSL (17) can be further modified to smooth acceleration and deceleration rates between changes in the longitudinally distributed speeds to create an Optimal Longitudinal Speed Profile (OLSP, 18), which represents optimized energy consumption. A signal can be produced if a driver's current speed rises unacceptably above a longitudinally distributed speed in real time. The signal can be audible, visible and/or haptic. Real-time traffic density information can be inferred by comparing current speed data to the longitudinally distributed speed for that position. If the current speed is consis-
(Continued)

tently lower than the longitudinally distributed speed for that position, an inference is drawn that the road section is inefficient. Road efficiency assessments can be transmitted to a service center and/or other vehicles, and used by navigation software.

20 Claims, 10 Drawing Sheets

(58) Field of Classification Search
USPC .......................... 701/117–119, 400, 408–410
See application file for complete search history.

(56) References Cited

U.S. PATENT DOCUMENTS

| | | | |
|---|---|---|---|
| 6,405,128 B1* | 6/2002 | Bechtolsheim et al. | 701/431 |
| 6,549,841 B1 | 4/2003 | Axelsson | |
| 6,650,948 B1* | 11/2003 | Atkinson et al. | 700/66 |
| 8,139,590 B2 | 3/2012 | Manral | |
| 8,290,695 B2* | 10/2012 | Hiestermann et al. | 701/119 |
| 2002/0120389 A1* | 8/2002 | Fushiki et al. | 701/117 |
| 2002/0177947 A1* | 11/2002 | Cayford | G01C 21/30 701/445 |
| 2003/0135304 A1* | 7/2003 | Sroub et al. | 701/1 |
| 2003/0187573 A1* | 10/2003 | Agnew et al. | 701/201 |
| 2004/0030670 A1* | 2/2004 | Barton | 707/1 |
| 2004/0034467 A1* | 2/2004 | Sampedro et al. | 701/201 |
| 2005/0065711 A1* | 3/2005 | Dahlgren et al. | 701/117 |
| 2005/0186965 A1* | 8/2005 | Pagonis et al. | 455/456.1 |
| 2006/0074546 A1* | 4/2006 | DeKock et al. | 701/117 |
| 2007/0027583 A1* | 2/2007 | Tamir | G06Q 30/0283 701/1 |
| 2007/0112475 A1 | 5/2007 | Koebler | |
| 2007/0288158 A1* | 12/2007 | Dorum | 701/207 |
| 2008/0071472 A1* | 3/2008 | Yamada | 701/209 |
| 2008/0221787 A1 | 9/2008 | Vavrus | |
| 2008/0294339 A1* | 11/2008 | Tauchi et al. | 701/212 |
| 2009/0300067 A1* | 12/2009 | Denaro | 707/104.1 |
| 2010/0076671 A1* | 3/2010 | Pryakhin et al. | 701/119 |
| 2010/0250127 A1* | 9/2010 | Hilbrandie et al. | 701/209 |
| 2010/0286907 A1 | 11/2010 | Hilbrandie | |
| 2010/0299055 A1 | 11/2010 | Hilbrandie | |
| 2010/0299064 A1 | 11/2010 | Hilbrandie | |
| 2010/0312472 A1 | 12/2010 | Hilbrandie | |
| 2011/0307165 A1 | 12/2011 | Hiestermann et al. | |
| 2011/0307166 A1 | 12/2011 | Hiestermann et al. | |

FOREIGN PATENT DOCUMENTS

| | | |
|---|---|---|
| EP | 1 973 078 A1 | 9/2008 |
| EP | 1973078 A1 | 9/2008 |
| WO | WO 2009 053405 A1 | 4/2009 |
| WO | WO 2009/053406 A1 | 4/2009 |
| WO | WO 2009/053407 A1 | 4/2009 |
| WO | WO 2009/053408 A1 | 4/2009 |
| WO | WO 2009/053410 A1 | 4/2009 |
| WO | WO 2009/053411 A1 | 4/2009 |

OTHER PUBLICATIONS

International Search Report dated Jul. 22, 2010 from International Patent Application PCT/EP2010/050363, the ISA was the EPO.

* cited by examiner

FIG. 4 Longitudinal Speed Profile (LSPs) for a Road Segment (Time Spans = 30 min.)
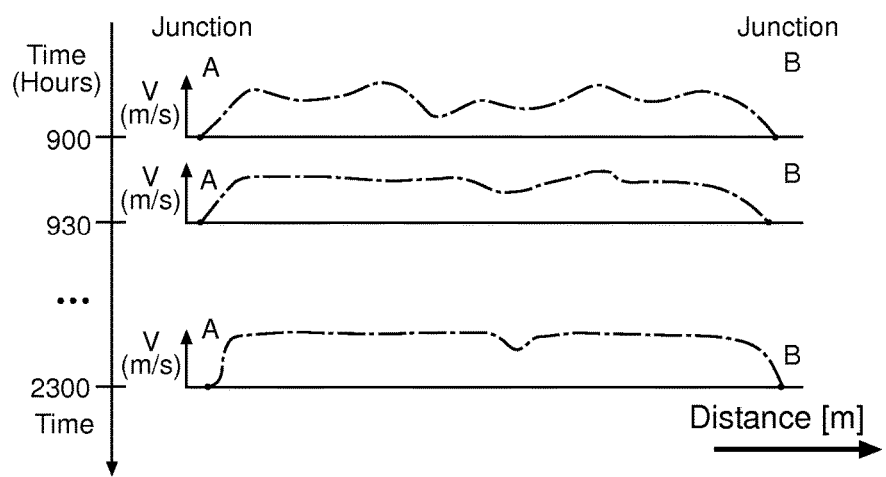
FIG. 9
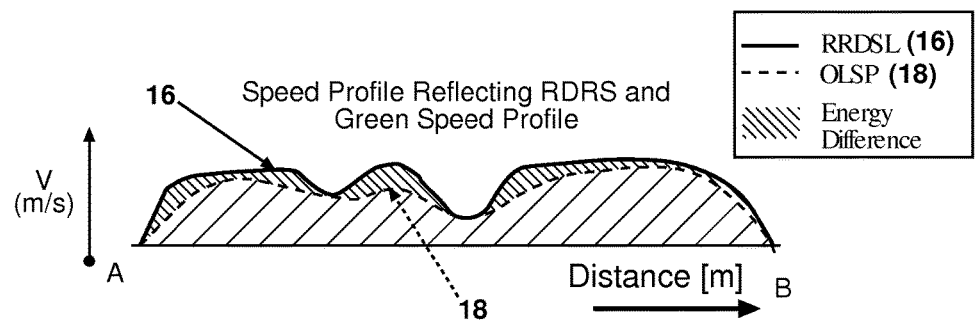

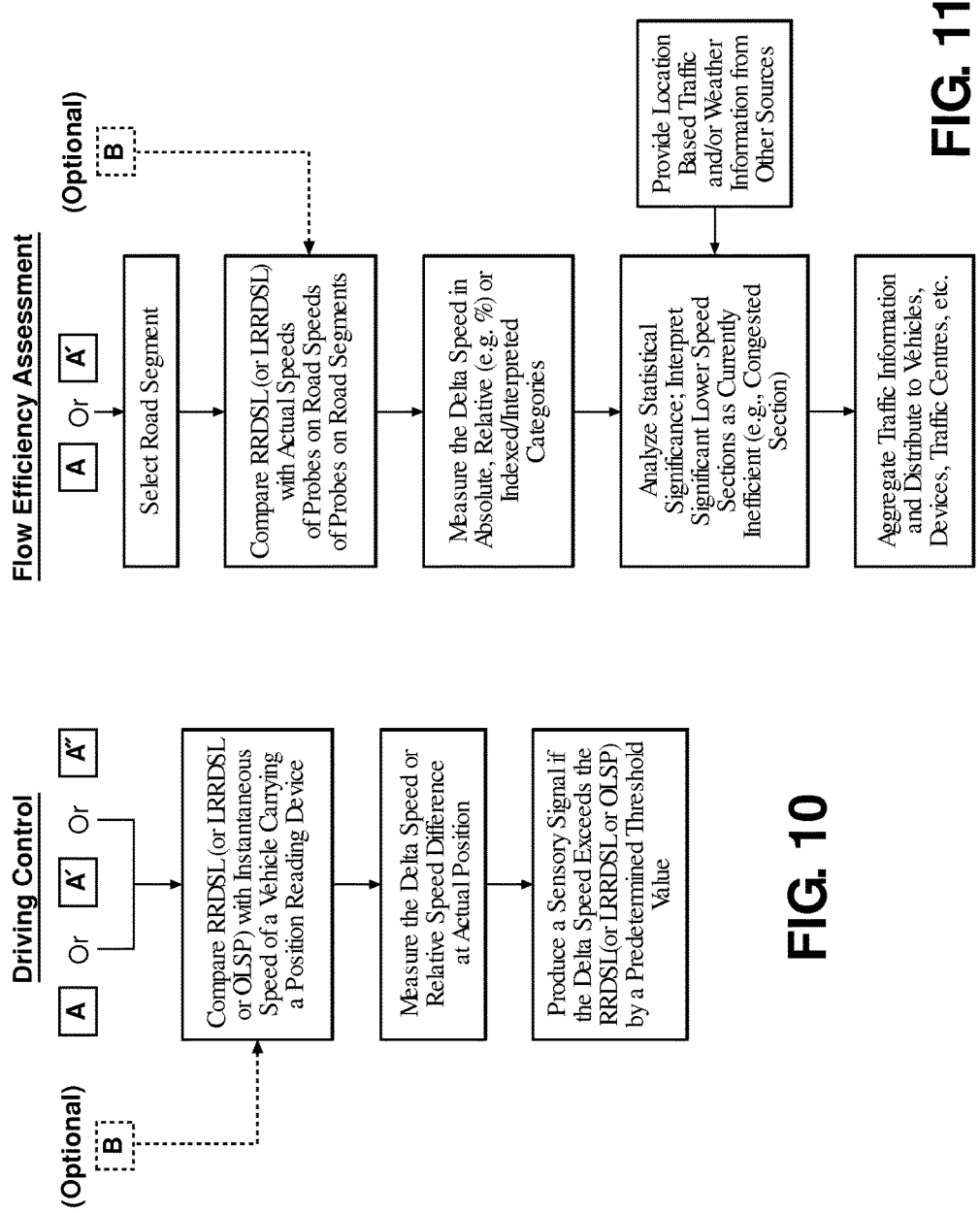

METHOD FOR CREATING SPEED PROFILES FOR DIGITAL MAPS

This application is the National Stage of International Application No. PCT/EP2010/050364, filed Jan. 13, 2010 and designating the United States. The entire contents of this application is incorporated herein by reference.

STATEMENT OF COPYRIGHTED MATERIAL

A portion of the disclosure of this patent document contains material which is subject to copyright protection. The copyright owner has no objection to the facsimile reproduction by anyone of the patent document or the patent disclosure, as it appears in the PTO patent file or records, but otherwise reserves all copyright rights whatsoever.

BACKGROUND OF THE INVENTION

Field of the Invention

This invention relates to digital maps of the type for displaying road or pathway information, and more specifically toward a method for supplementing a digital map with longitudinal speed profile information and toward a navigation device or any GNSS enabled unit used in conjunction therewith.

Related Art

Personal navigation devices like that shown generally at 10 in FIG. 1, for example, utilize digital maps combined with accurate positioning data from GPS or other data streams. These devices 10 have been developed for commuters seeking navigation assistance, for businesses trying to minimize transportation costs, and many other useful applications. The effectiveness of such navigation systems is inherently dependent upon the accuracy and completeness of the information provided to it in the forms of digital maps and associated features and attribute data. Likewise, the effectiveness of such navigation systems is also dependent upon accurately and quickly matching the actual, real-world location of the navigation device to a corresponding portion of the digital map. Typically, a navigation system 10 includes a display screen 12 or graphic user interface that portrays a network of streets as a series of line segments, including a center line running approximately along the center of each street or path, as exemplified in FIG. 1. The traveler can then be generally located on the digital map close to or with regard to that center line. Such GPS-enabled personal navigation devices, such as those manufactured by TomTom N.V. (www.tomtom.com), may be also configured as probes to record its position at regular intervals. Such probe data points comprise a sequence of discrete positions recorded at a particular time of the day taken at intervals of, for example, one second. Of course, other suitable devices may be used to generate probe data points including handheld devices, mobile phones, PDAs, and the like.

It is known, for example, to take probe data inputs from low-cost positioning systems, handheld devices and GPS-enabled mobile phones. The probe data, which creates the nodes or probe positions at regular intervals, can be transmitted to a collection service or other map making or data analysis service via wireless transmission, communicated via Internet uploads, or otherwise collected for analysis. Through this technique road geometry, features and attributes can be inferred, and traffic flow patterns and behaviors discerned. FIG. 2 is a representative example of raw probe data reflecting positions collected over a period of days from a downtown, city-center area of Ottawa, Canada. From this raw probe data, even an untrained eye can begin to discern road geometries. Each data point represented in the illustration of FIG. 2 includes information as to the particular time of day that the data point was recorded. Thus, while FIG. 2 depicts only position data, the recorded data also provides a time stamp for each position. Furthermore, each individual probe creates a trace which can be analyzed for travel speeds, accelerations, stops, and the like.

Traditional routing methods use maximum speed limits as exist along road segments to calculate travel time estimates, however in practice speed limit information is not accurate because these speeds are not always possible at various times of the day. Speed profiles have been derived by intensively processing this probe data to create average traffic speeds for each road segment, i.e., for each section of road in the digital map, for different time slots or times of the day. See, for example, the TomTom IQ Routes™ product. See for example FIG. 4 which shows several derived speed profiles for a particular road segment (AB) during several different time spans of 30-minute increments.

The IQ Routes™ product uses anonymous probe data to discover actual patterns in driving speeds. Typically, route calculations before IQ Routes used 0.85% of the maximum speed limit in its calculation—IQ Routes by contrast uses the speeds actually driven on those roads. (Alternatively, a likely speed value can be derived from the road classification. E.g. when legal speed limits are not available.) This data is applied to a profile model and patterns in the road speeds are identified in time spans (e.g., 5 minute increments) throughout the day. The speed profiles are applied to the road segments, building up an accurate picture of speeds using historical data. All of these speed profiles are added to the existing IQ Routes data built into the map stored in the navigation device 10, to make it even more accurate and useful for premium routing and travel time estimates. Speed profiles therefore represent a continuous or semi-continuous averaged speed distribution of vehicles derived from probe information, driving along the same section of the road and direction. Speed profiles reflect speed variations per segment per time interval, but are not longitudinally distributed in the sense that they do not describe velocity variations along the length of a link or road segment.

While very useful, these prior art speed profile techniques do not provide any indication of the most efficient speed at which to drive any particular road segment, or indeed any indication of the actual manner (e.g., acceleration/deceleration rates) in which a vehicle traverses a particular road segment. It is known, for example, that vehicles driven with frequent start-stop type motions and aggressive accelerations-decelerations are very energy inefficient. Conversely, maintaining a vehicle at a steady speed, particularly if the speed is around the commonly accepted optimum vehicle speed of about 56 mph, and moderating accelerations-decelerations is a far more energy efficient strategy. In the real world, one road segment will vary dramatically from the next road segment in terms of the particular bends, lane consolidations or lane expansions, traffic controls, and other measures that affect traffic speed in addition to the instantaneous traffic volume. For these reasons, it is often impossible to achieve optimum vehicle efficiency by driving a vehicle at a constant speed.

Because prior art techniques do not indicate the most efficient speeds and acceleration-deceleration rates at which to drive any particular road segment, there has been a lack of useful information pertaining to real-time traffic flow conditions as may exist along any particular road segment or section of roads.

It is therefore desirable to ascertain the most efficient manner, e.g., speeds and possibly acceleration-deceleration rates, in which to drive any particular road segment. With such information, it would be possible to provide real-time energy efficient driving instructions for drivers operating with a position determining and/or navigation-capable device, which information accounts for the unique characteristics of any particular road segment. Furthermore, knowledge of the most efficient manner in which to drive a particular road segment will enable accurate, real-time assessments of the traffic flow conditions along that road segment.

SUMMARY OF THE INVENTION

The invention provides a method for creating longitudinally distributed speed data useful for various traffic modeling applications based on free flow traffic conditions. An optimal time span is identified with free flow traffic conditions along a road segment, e.g. early morning with good light conditions. Probe data recorded during the optimal time span and selected on basis of e.g. lane or vehicle type, is collected and then used to statistically derive a longitudinally distributed speeds at positions along the road segment during the optimal time span. Alternatively, probe data representative of the fastest probes for a road segment and direction may be selected and collected without identifying a specific optimal time span. The longitudinally distributed speeds are then associated with the road segment and either stored in a stand-alone database or added to an existing digital map as a data layer. The longitudinally distributed speeds represent realistic free flow driving conditions against which the instantaneous driving speed of any vehicle can be compared for various traffic modeling applications.

In one embodiment of this invention, the instantaneous driving speed of a vehicle is compared to the longitudinally distributed speed for that position so that real-time energy efficient driving instructions can be issued. In another embodiment of this invention, instantaneous driving speed of one or more vehicles is compared to the longitudinally distributed speeds for the purpose of assessing the flow efficiency of traffic along a road segment.

According to another aspect of this invention, a method for making road traffic flow efficiency estimates based on free flow conditions derived from select probe data is described. A digital map is provided having at least one longitudinally extending road segment. Probe data is collected from a plurality of probes traversing the road segment, each probe developing a respective probe trace comprising a sequence of discrete probe positions recorded at a particular time of day. An optimal time span is identified with free flow traffic conditions. Probe data recorded during the optimal time span is selected and then used to statistically derive longitudinally distributed speeds at positions along the road segment during the optimal time span. Alternatively, probe data representative of the fastest probes for a road segment and direction may be selected and collected without identifying a specific optimal time span. The longitudinally distributed speeds are associated with the road segment. A vehicle travels the road segment at an instantaneous speed, while a comparison is made between the instantaneous speed of the vehicle at its location with the associated longitudinally distributed speed to derive a speed difference. The current flow efficiency level of the road segment can then be classified based directly on the derived speed difference.

The subject invention builds upon known techniques, like the averaged speed profiles used in TomTom IQ Routes, to provide an indication of the most efficient speed at which to drive any particular road segment at any point along its length, together with an indication of the actual manner in which energy efficient speed variations may be practiced. This is accomplished by processing a subset of probe trace log data, which subset is collected during periods when traffic volumes are traditionally low or else observed to represent the highest speed data set. For each subset of data, with reference to map data, the particular road segment or collection thereof, varying speed profiles are created, i.e., longitudinally distributed speeds. Clustering such data for multiple probes and averaging the data provides a Raw Road Design Speed Limit (RRDSL) for a particular road segment. The RRDSL accounts for real life road geometries, features or other conditions which prevent travel at a steady speed. The RRDSL may be limited by legal speed limit data or an artificial threshold to provide a blended maximum allowable and optimal detailed variation of driving speed for each road segment (LRRDSL). The RRDSL and/or LRRDSL can be modified so as to smooth the transition through changes in the longitudinally distributed speeds, and thereby derive an Optimum Longitudinal Speed Profile (OLSP). The RRDSL and/or LRRDSL and/or OLSP can be integrated into and combined with an existing digital map database for delivery to PNDs or other navigation-capable equipment or systems having navigation software operating therein and which are capable of using the additional profile data. Furthermore, the digital map may also be augmented with statistical information of the probe processing (e.g. standard deviation) and possibly other details. The methods of this invention are also applicable to mapping and/or routing services occurring off-board or being retrieved over the web, such as on mapping and routing web sites used by internet users.

BRIEF DESCRIPTION OF THE DRAWINGS

These and other features and advantages of the present invention will become more readily appreciated when considered in connection with the following detailed description and appended drawings, wherein:

FIG. 4 is a chart showing derived Longitudinal Speed Profiles (LSP) for an exemplary road segment (AB), for a particular direction of travel, during different time spans, in this example in 30-minute increments;

FIG. 9 is a simplified longitudinal speed diagram for a road segment AB, showing both the RRDSL and OLSP, with energy savings represented by the OLSP being shown as an energy difference between the curves;

FIG. 10 is flow diagram describing a method for assisting a driver to observe either the RRDSL, LRRDSL or OLSP;

FIG. 11 is flow diagram describing a method for assessing the congestion level of a road segment by comparing the difference in current speed and the RRDSL or LRRDSL.

DETAILED DESCRIPTION OF THE PREFERRED EMBODIMENT

Figure 1:
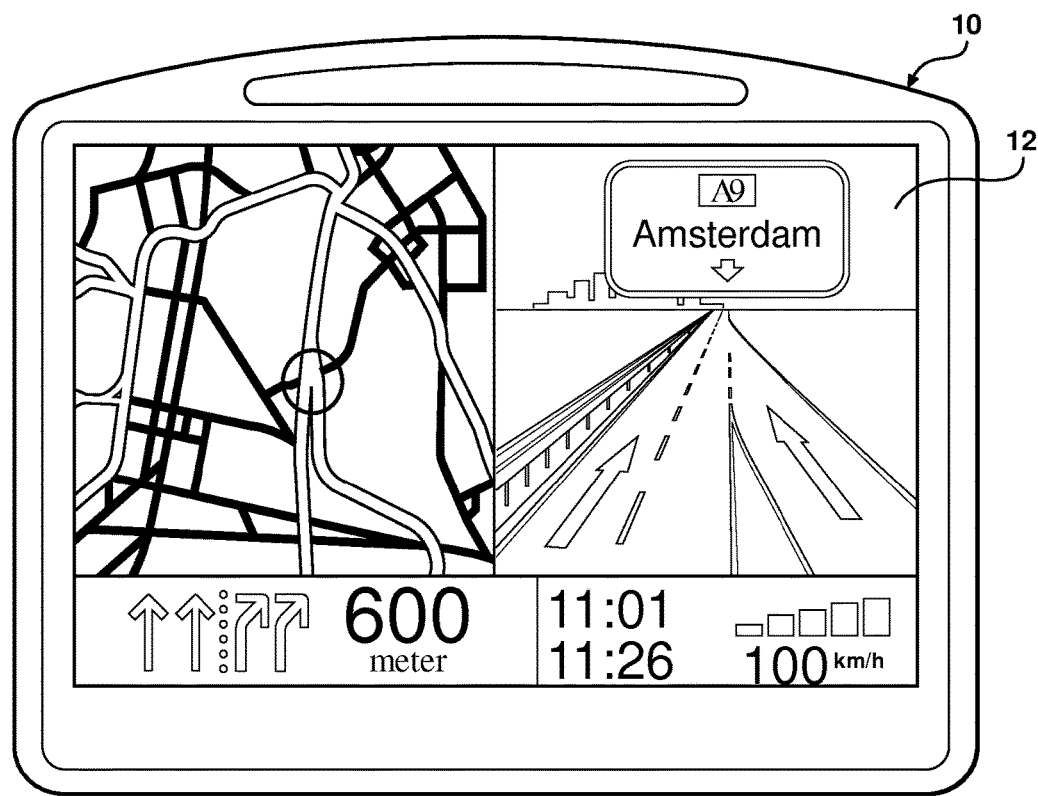
FIG. 1 is an exemplary view of a portable navigation system according to one embodiment of the subject invention including a display screen for presenting map data information and including a computer readable medium having navigation software recorded thereon.
Figure 2:
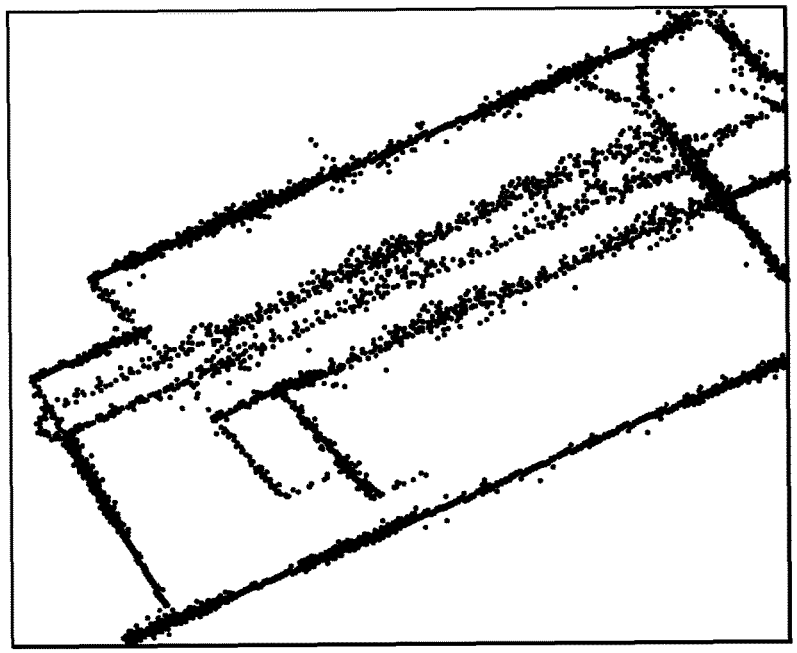
FIG. 2 is an example of raw probe data reflecting latitudinal and longitudinal positions (i.e., relative to road centreline) collected from a downtown, city-center area of Ottawa, Canada.

Referring to the Figures, wherein like numerals indicate like or corresponding parts throughout the several views, this invention pertains to position reading devices, navigation systems, ADAS systems with GNSS (Global Navigation Satellite System), and the digital maps used by navigation systems. This invention is therefore applicable to all kinds of navigation systems, position reading devices and GNSS enabled units including, but not limited to, handheld devices, PDAs, mobile telephones with navigation software, and in-car navigation systems operating as removable or built-in devices. The invention can be implemented in any type of standard navigation system available on the market, on mapping and navigation web sites/servers as far as energy efficient route planning is concerned, as well as suitable systems which may be developed in the future.

The navigation-capable device typically includes a computer readable medium having navigation software recorded thereon. A microprocessor associated with the device may be programmed to provisionally match the navigation device to a particular road segment in a digital map and then to make an assessment whether the provisional match is reliable. If not reliable, the system may rely on other techniques to determine the position of the navigation-capable device, such an auxiliary inertial guidance system for example. Such inertial guidance systems may also include other features such as a DMI (Distance Measurement Instrument), which is a form of odometer for measuring the distance traveled by the vehicle through the number of rotations of one or more wheels. Inertial measurement units (IMUs) may be implemented with gyro units arranged to measure rotational accelerations, with suitable accelerometers arranged to measure translational accelerations. The processor inside the navigation device may be further connected to a receiver of broadband information, a digital communication network and/or a cellular network.

A microprocessor of the type provided with the navigation device according to this invention may comprise a processor carrying out arithmetic operations. A processor is usually connected to a plurality of memory components including a hard disk, read only memory, electrically erasable programmable read only memory, and random access memory. However, not all of these memory types may be required. The processor is typically connected to a feature for inputting instructions, data or the like by a user in the form of a keyboard, touch screen and/or voice converter.

The processor may further be connected to a communication network via a wireless connection, for instance the public switch telephone network, a local area network, a wide area network, the Internet or the like by means of a suitable input/output device. In this mode, the processor may be arranged to communicate as a transmitter with other communication devices through the network. As such, the navigation-capable device may transmit its coordinates, data and time stamps to an appropriate collection service and/or to a traffic service center.

As stated previously, it is known that improved fuel efficiency can be achieved by maintaining a constant, optimal vehicle speed. As a rule of thumb, this constant vehicle speed may be approximately 45-60 mph, however that range may vary from one vehicle type to another, as well as being influenced by environmental conditions, road geographies, and the like. It is further known that various road characteristics such as sharp turns, speed bumps, lane expansions/consolidations, traffic controls and other features can influence the ability to safely travel at a constant speed along a particular segment. For this reason, the subject invention provides new, detailed map content to be used in connection with the navigation software applications to provide optimal energy-efficient driving speed recommendations.

Figure 3:
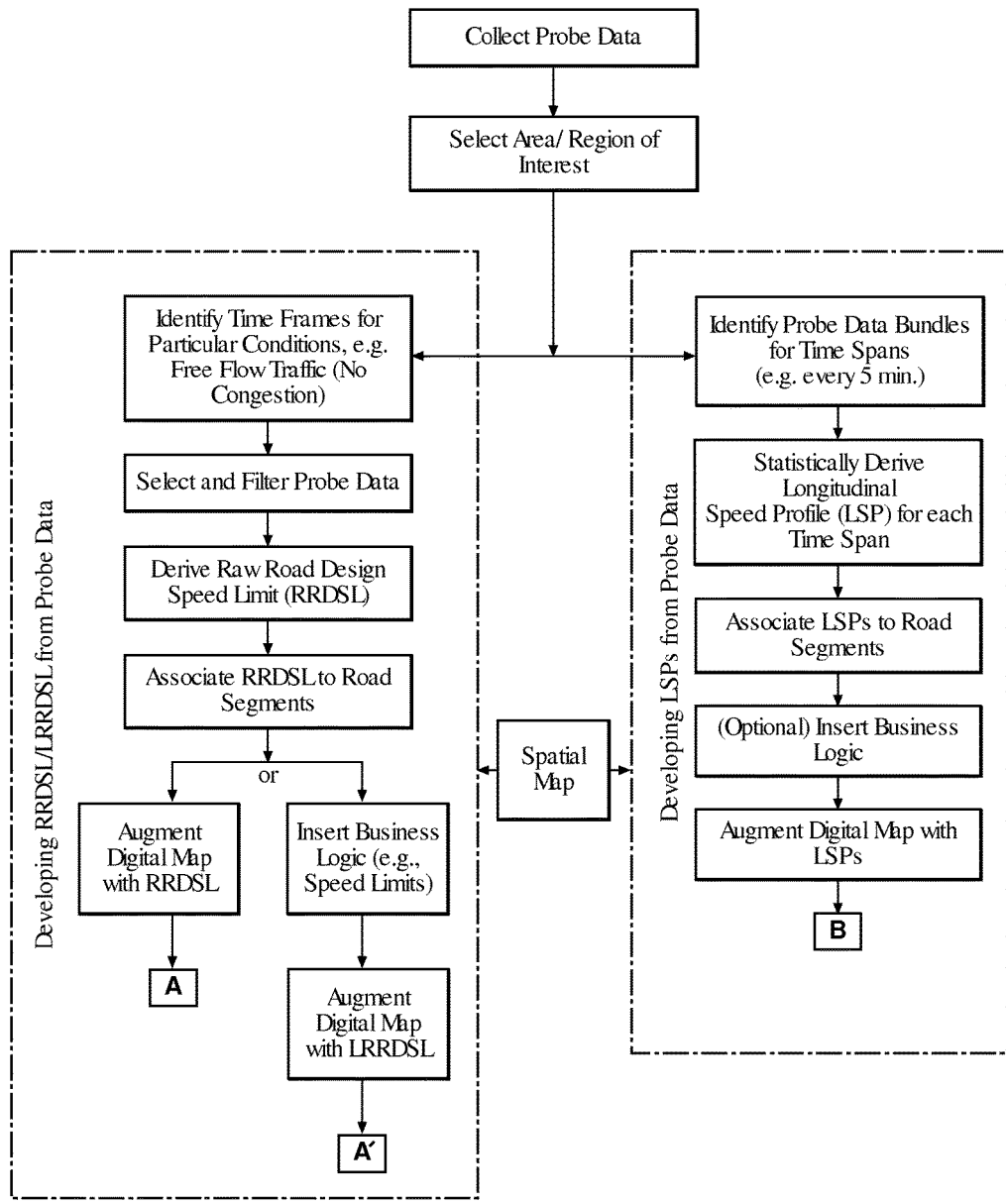
FIG. 3 is a flow diagram describing the derivation of a Raw Road Design Speed Limit (RRDSL) and/or a Legal Raw Road Design Speed Limit (LRRDSL) from probe data, together with the creation of Longitudinal Speed Profiles (LSP) from probe data.

A Raw Road Design Speed Limit (RRDSL) may be derived from the collected probe data, according to the steps outlined in FIG. 3. With regard to determining an RRDSL, the first step is to identify the time frame during which free flow traffic (no congestion) occurs. Once this free flow time span is known, the probe data for that time span is bundled, and then statistically analyzed to derive the speed at every point along the link, i.e., the road segment. Alternatively to selecting an optimal time span, the probe data can be analyzed to identify the higher probe speeds regardless of the time span. This process of deriving the speed at every point along the link is carried out for every road segment (or as many segments as practical. The RRDSL may be associated with its respective segment as an attribute. In this manner, the digital map is augmented with the RRDSL attribute. Additionally, an attribute reflecting the averaged or longitudinal statistical information of the probe data along the road element (e.g standard deviation) can be added to the digital map.

The RRDSL represents the longitudinally variable (vehicle) speed at any location along a road section in one direction where no obstructions to traffic are observed. The RRDSL for each road segment is either taken from probe data at a time span where free flow traffic conditions are observed, or taken from probe data possessing the highest speeds regardless of the time span. For many road segments, free flow conditions will occur in the early morning hours when the fewest number of vehicles are traveling the roads. Thus, a speed profile (like that obtained from the TomTom IQ Routes™ product) taken at the time of the least traffic congestion may be somewhat similar to the RRDSL for a given road segment, but the IQ Routes™ speed profile will be a single average speed for the entire road segment whereas the RRDSL will typically have speed changes along the length of the road segment.

The RRDSL is thus characteristic for specific locations along a road link and renders all effects which physically restrict the vehicles from going faster. As the information is derived from vehicle probes and reflects true driving, it may at times exceed the legal speed restriction. When the RRDSL is represented along a road in a continuous or semi continuous way, one could call it an undisturbed speed which, when driven, is influenced primarily by the physical attributes of the road segment (e.g., its geometry) and the posted speed limits (if any). The RRDSL can therefore be classified an attribute of a road segment; it does not vary over time of day. Only when road construction changes or road furniture is changed, or probe statistics change, is the RRDSL expected to change. As an attribute, it is possible to consider future applications of this concept in which, for example, a percentage of the stored RRDSL could be taken in case weather/surface conditions are known. As probe data content and resolution improvements are available, lane and/or vehicle category dependencies may be represented in the RRDSL. For example, with sufficient data content, the RRDSL may reflect regulatory situations such as higher speed limit on left lane or lower speed limit for commercial vehicles, etc. That is, the RRDSL can optionally be dependent on the specific vehicle type, or more generalized in vehicle categories (e.g. Powered Two Wheeler, Heavy Truck, Light Commercial Vehicle or Passenger car). The RRDSL is particularly useful for Advanced Driver Assistance (ADAS) and other driving control purposes.

Accordingly, the RRDSL is derived from selected and filtered probe data which has been collected during periods of time when traffic flow is at or near its lowest for a particular road segment, i.e., at free flow conditions, or which has demonstrated the highest speeds. The RRDSL 16 is a function of the longitudinal profile, based on position along a road section and of the travel-based direction profile (i.e., f(p, d)). One might possibly consider the RRDSL 16 also a function a time-interval based profile as well as of a lane-specific profile (i.e., f(p, d, t, l)) if one wishes to accommodate longer-term changes such as constructions, change in road furniture, and the like.

FIG. 4 shows exemplary Longitudinal Speed Profiles (LSPs) derived from probe data (like that of FIG. 3) for a hypothetical road segment (AB), for a particular direction of travel, during consecutive 30-minute time spans. Unlike the traditional speed profiles taught, for example, by the IQ Routes™ product, these profiles represent longitudinally (i.e., in the direction of the road centreline) varying average speed distributions of vehicles derived from probe information, driving along the same section of the road and direction. These LSPs describe velocity variations along the length of a link or road segment for a specified time span. For the time span(s) which coincide with free flow traffic conditions, the LSP will be equivalent to the RRDSL 16. Once derived from the collected probe data, the LSPs are associated with the respective road segment and either stored in a stand-alone database or added to an existing digital map as a data layer.

Figure 5:
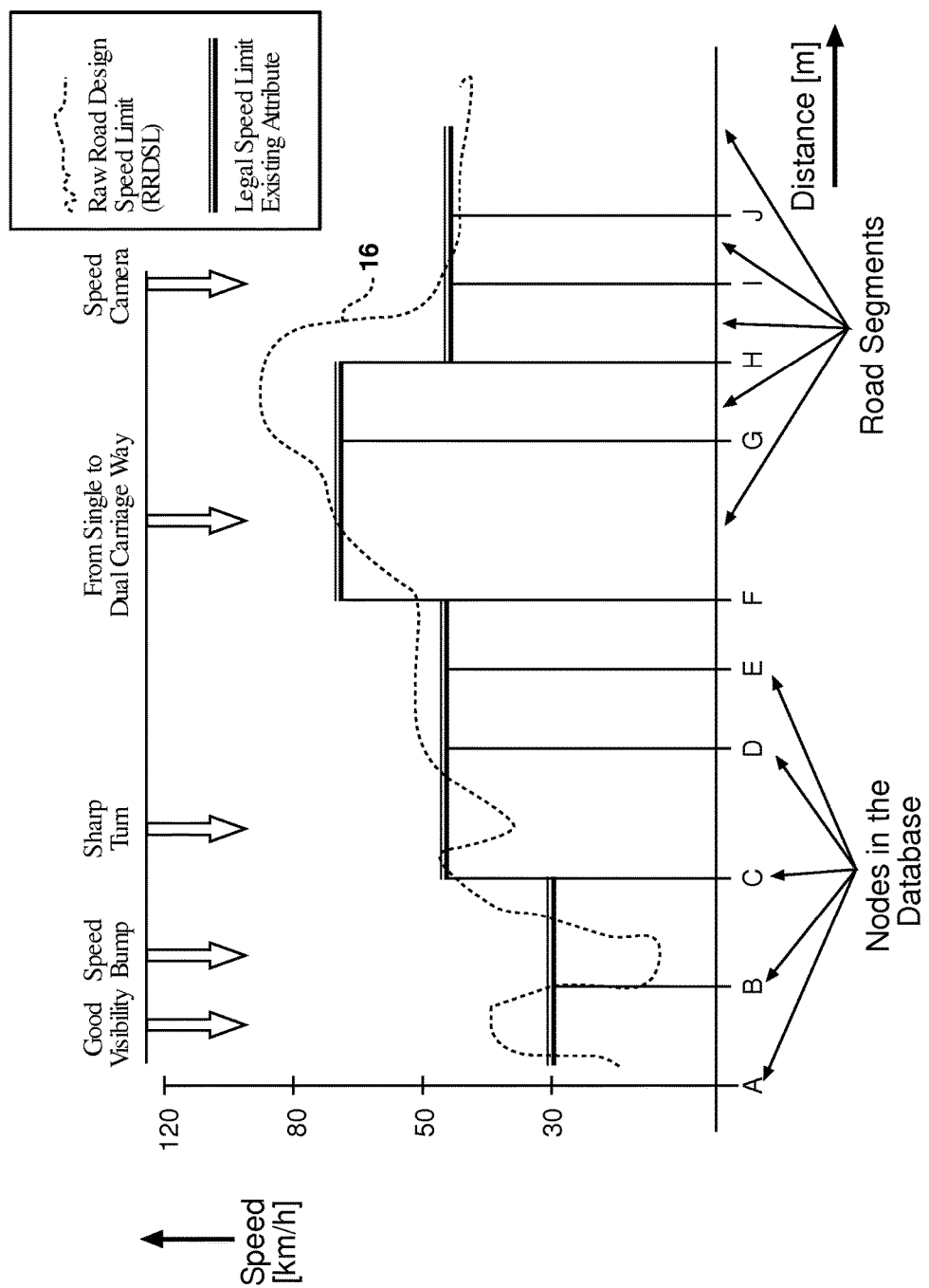
FIG. 5 is a diagram representing the posted speed limit for several consecutive road segments (AB-IJ), together with the RRDSL (16) for the same road segments.

FIG. 5 is a sample chart depicting consecutive road segments AB, BC, . . . IJ. Each road segment has a legal speed limit which is recorded in the digital map as an attribute. These speed limits are represented by the heavy, horizontal lines occurring at 30, 50 and 75 km/h. Broken line 16 represents the RRDSL for the same road segments (AB, BC, . . . IJ) which has been developed by bundling probe data recorded during an optimal time span (e.g., 0200-0230) and then averaging the results. Variations in the RRDSL 16 speeds can be attributed to features and geometries and attributes associated with each road segment, as suggested along the upper margin of the illustration. Features such as good physical visibility e.g. no obstructions or objects in line of sight, and expansion of roadway from single to dual carriageways are shown to result in velocity increases in the RRDSL 16 speed, whereas features such as speed bumps, sharp turns and speed cameras mark declines in the RRDSL 16 speed, in many instances below the legal speed limit. The RRDSL 16 can vary even within the context of a single road segment, is associated in the digital map with the particular road segments and made available to navigation-capable devices which utilize the digital map in an interactive manner. As suggested earlier, one embodiment of this invention contemplates a target driving speed derived by considering the dynamic environmental situation (e.g., degraded road surface conditions or poor weather) and calculating a fraction of the RRDSL.

The RRDSL 16 can be attributed to its associated road segment in a digital map database in various ways. For some examples, an RRDSL 16 can be represented and stored as a parametric curve as a function of distance, or perhaps as a set of discrete optimal speeds between which to linearly interpolate, or normalized variations (percentages) above and below a legal speed limit/artificial threshold, to name a few possibilities. Those of skill in the field of digital map database construction and implementation will readily appreciate these and possible other suitable techniques how to represent and store an RRDSL 16 in a map database. Furthermore, various averages can be stored in a digital map, and provided for different types of vehicles. In the case of multi-lane road segments, e.g., dual carriageways, variations in such profiles can also be lane dependent. In addition, a sub attribute representing the statistical signal of the RRDSL 16, e.g. in the form of a standard deviation, can be stored in the map as well. Either as an average value, or as a longitudinal varying representation along the road element.

Once the RRDSL 16 has been determined, and then associated with road segments in a digital map, a driver operating with a navigation-capable device is able to continually compare their current speed (derived from successive GPS coordinates of the current time, or optionally derived from in-car sensor data) with the undisturbed speeds represented by the RRDSL 16 for the particular road segment. In the event of bad weather, environmental or surface conditions, a percentage of the RRDSL 16 may be used instead of the actual derived speeds which is proportional to the degraded driving conditions. The navigation device then provides successive instructions or suggestions to the driver in audible, visual and/or haptic form, so that the driver might alter their driving speed to match or more closely mimic the target speeds along the road segment on which the vehicle is currently traveling. As a result, the driver can expect to optimize their use of fuel in the most realistic manner possible, because the free flow conditions (upon with the RRDSL 16 was derived) represent the closest to steady-speed operation taking into account the practical considerations of road geometry and other real-world factors that influence driving speeds. This not only reduces operating costs of the vehicle, but also reduces vehicle emissions to the atmosphere and can improve driver comfort by reducing driver stress and fatigue. In more advanced systems, including the so-called ADAS applications which partly automate or take over driving tasks, the navigation device may even take an active role in conforming the current speed to the RRDSL 16 speeds. Thus, in order to achieve high energy conservation, sensory signals (e.g., audible, visual and/or haptic) will be activated by the navigation device if the current, instantaneous speed of the carrying vehicle exceeds the RRDSL 16 target speed by some threshold value. For example, a threshold value of ±5 km/h, or a percentage (e.g., 10%) may be established.

Figure 6:
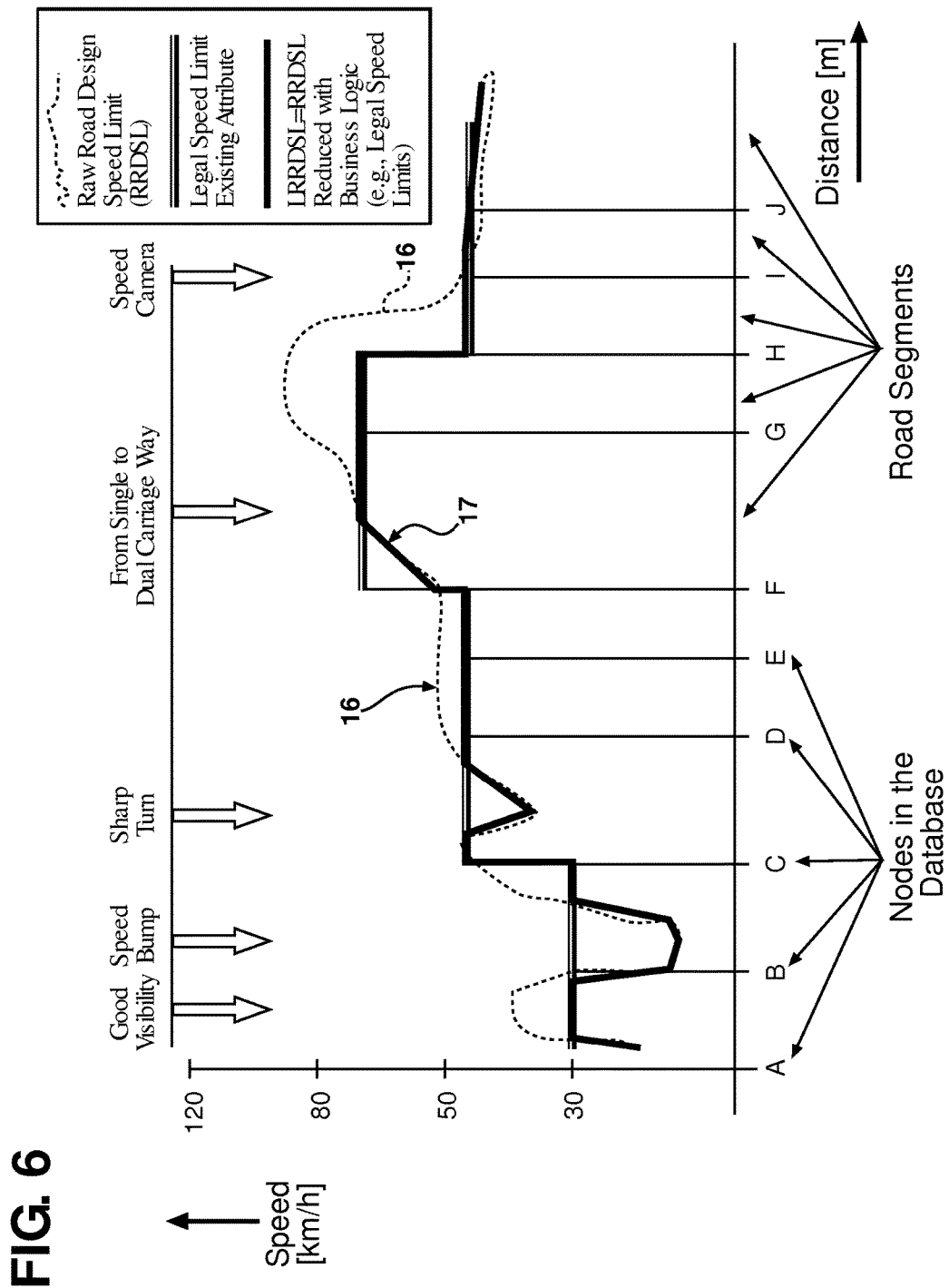
FIG. 6 is a diagram as in FIG. 5 but showing also the LRRDSL (17) for the same road segments (AB-IJ)

As shown in FIG. 5, it is foreseeable that, in many real life situations, the RRDSL 16 will at times exceed the posted legal speed limits for a particular road segment. It is possible, indeed preferable, therefore to reduce the target speeds of the RRDSL 16 to the legal speed limit whenever it exceeds the established speed limit at any point along the particular road segment. Thus, as shown in FIG. 6, the target speeds may be capped at each point where it rises above the local legal speed limit, resulting in a so-called Legal Raw Road Design Speed Limit (LRRDSL) 17. It is to be understood, however, that use of the term "legal" in this context does not preclude strategic limitation of the RRDSL speeds for reasons other than compliance with local speed regulations. For example, road segments in some jurisdictions may not impose any upper speed limit. This is sometimes the case along sections of the Autobahn in Germany for example. Applying principles of this invention to such unrestricted sections of roadway may result in a distribution of probe speeds with a very large spread, e.g., real speeds between 100 kph and 200 kph. In such cases, it may be advisable to impose an artificial maximum threshold that is mindful of fuel economy statistics. Thus, for example, in road segments without legal speed limits, an artificial maximum threshold of 110 kph might be established, and used to limit the LRRDSL 17 where ever it exceeds the artificial threshold.

Figure 7:
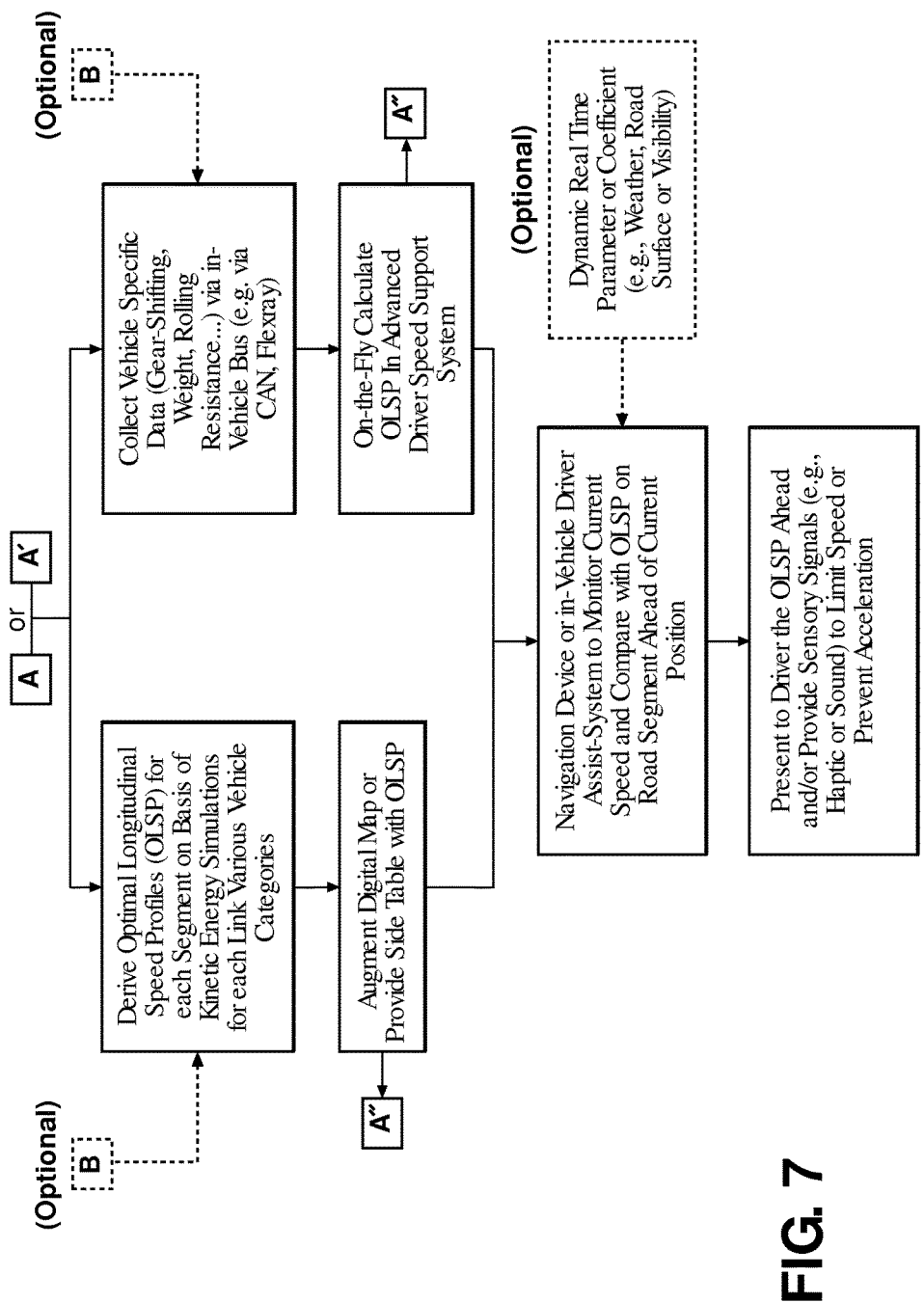
FIG. 7 is a flow diagram describing the derivation of an Optimum Longitudinal Speed Profile (OLSP) from either the RRDSL or LRRDSL, for a particular direction of travel.

As will be appreciated by reference to the RRDSL 16 and LRRDSL 17 curves as shown in FIG. 6, sharp changes may sometimes occur in the target speed. Sharp target speed increases require heavy acceleration, whereas sharp target speed decreases require strong deceleration. To improve energy efficiency amid sharp changes in the target speed, an Optimal Longitudinal Speed Profile (OLSP) 18 may be introduced. The flow chart of FIG. 7 describes two alternative approaches to deriving the OLSP 18. In one approach, the OLSP 18 is derived on the basis of kinetic energy simulations for various vehicle types or categories. In this case, the OLSP 18 is simply attributed to the respective road segment in the digital map. Alternatively, the OLSP 18 can be computed dynamically, i.e., on the fly, on the basis of data specific to the vehicle. Regardless of the method used, the target speed dictated by the OLSP attribute 18 is then used as the standard against which current vehicle speed is compared. As shown, an optional step "Dynamic real time parameter or coefficient (e.g. weather, road surface or visibility)" may feed into the step "Navigation Device or Invehicle Driver Assist system to monitor current speed and compare with OLSP on road segment ahead of current position." This enhanced real time OLSP 18 can alternatively be applied to the RRDSL 16 or the LRRDSL 17. The dynamic parameter could be manifested as an absolute delta speed, or a relative speed differential (i.e., a percentage) or speed that is categorised/indexed (e.g., low/med/high) to the OLSP 18 (or the RRDSL 16 or LRRDSL 17). This dynamic parameter may be provided to the navigation device 10 so that the system can calculate navigation and driving guidance instructions taking into account the real time dynamic situation, relative to the free flow target speed indicated by the OLSP 18 (or the RRDSL 16 or LRRDSL 17). In addition, information can be provided to the navigation device 10 identifying the cause of the change of the parameter (e.g. congestion, partly road/lane closure, road works, road surface conditions, visibility, weather, events and incidents, etc.)

Figure 8:
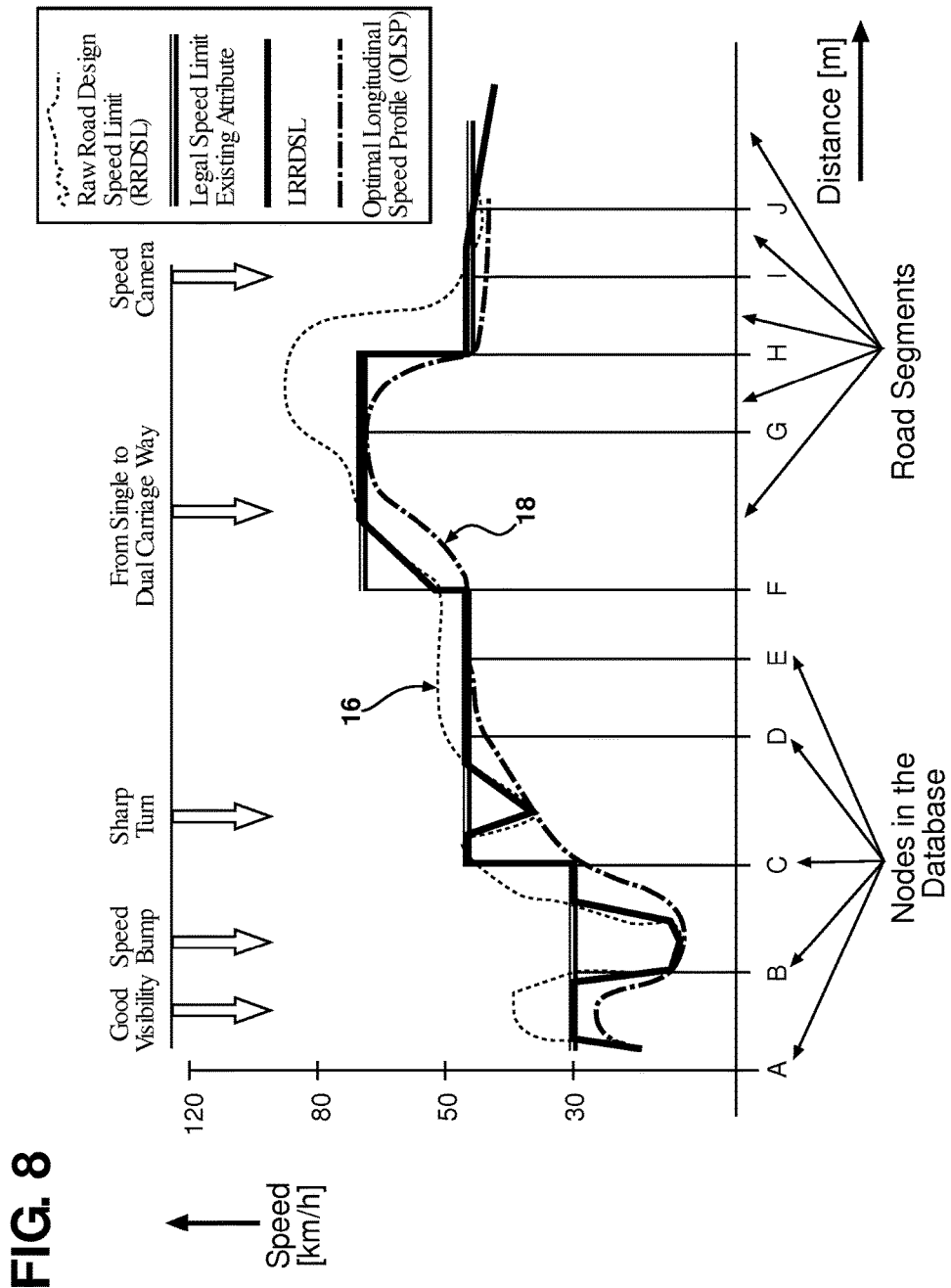
FIG. 8 is a diagram as in FIG. 6 but showing also the OLSP for the same road segments (AB-IJ)

Ideally, the comparison is proactive, in the sense that it is made on the road segment ahead of the current position so that an appropriate sensory signal (e.g., visual, sound, haptic, etc.) can be issued, considered by the driver and reacted upon in time with the movement of the vehicle. FIG. 8 shows the diagram of FIG. 6 superimposed with an OLSP 18. The OLSP 18, like the RRDSL 16, is also a function of the longitudinal profile, based on position along a road section and of the travel-based direction (i.e., f(p, d)). It may also be a function of vehicle category (passenger car, bus/truck, powered two-wheeler), and is also preferably, but not necessarily, a function of a regulation dependency (like the LRRDSL 17). Apart from being efficient due to minimal accelerations, minimizing the energy spend over the road segment also reflects a speed which will be close to the legal speed limit on the higher road classes. In fact, vehicle manufacturers typically optimize the power trains of their vehicles to be most efficient between 85-95% of their top speed, which nearly always reflects the legal speed or speed restrictions in the region. Stated simply, the OLSP 18 is a continuous or semi-continuous averaged speed distribution of vehicles driving along the same road and direction, considering the RRDSL 16 or the LRRDSL 17, and minimizing the number of accelerations/decelerations but keeping close to the RRDSL 16 (or LRRDSL 17) when no junctions are approached. Again, the term "longitudinal" appearing in the OLSP refers to the (semi) continuous description of this information along a road's axis. The highest average speed profiles are represented by the RRDSL 16. Using the RRDSL 16, or rather the trimmed version LRRDSL 17, the OLSP 18 can be calculated by investigating the changes in energy involved in the system.

Computing the OLSP 18 respects the difference between the need for acceleration changes to be as small as possible, and keeping a fluent profile whilst keeping the vehicle in a speed zone for which the manufacturer optimized the functioning of its power train. Those of skill in the field will appreciate various methods to derive the OLSP 18 from the LRRDSL 17 (or if preferred from the RRDSL 16). With regards to derivation of the optimal acceleration and decoration strategy, there exist some models in the state of the art that can be well used for this purpose. In one approach, boundaries are set on acceleration values. See, for example, the Optimal Velocity Profile Generation for Given Acceleration Limits described at: http://soliton.ae.gatech.edu/people/ptsiotra/Papers/acc05b.pdf. In another approach, mathematical models can be constructed to predict energy costs for motor vehicles along roads. These models are fed with vehicle characteristics and a specific longitudinal speed profile. Linked to the energy estimation models are those which predict fuel cost and emission values. Modeling examples include PAMVEC, ARFCOM, and ARTEMIS. Details about the PAMVEC model can be found at: http://www.itee.uq.eduau/~serl/_pamvec/PhD_Thesis_AGS_Chap3.pdf. Details about the ARFCOM model can be found at: http://www.transport-links.org/transport_links/filearea/publications/1_773_PA3639.pdf. Details about the ARTEMIS model can be found at: http://www.epa-.gov/ttn/chief/conference/ei18/session6/andre.pdf.

The energy difference optimized by the OLSP 18 in relation to the RRDSL 16 is represented in FIG. 9 by the shaded area. The energy saved by observing the OLSP 18 rather than the RRDSL 16 is proportional to the available energy conservation. Individual vehicles driving according to the OLSP 18 will be using less fuel. The surrounding traffic will be influenced with the behaviour of the vehicles driving according to the recommendations based on the OLSP 18 (or an OLSP 18 enhanced with a dynamic parameter). Thus, the OLSP 18 will not only impact the vehicles actually using the information but will also have a significant and beneficial secondary impact on surrounding traffic.

Therefore, as shown in FIG. 10, a driver operating with a navigation-capable device 10 enabled by this invention may continually compare their current driving speed with the target speed represented by any, or a combination of the attributes 16, 17, 18 for the particular road segment and/or for the upcoming road segment. A Delta Speed, or speed difference in percentage, can thus be measured at an actual position. The navigation device then provides successive instructions or suggestions to the driver in audible, visual and/or haptic form, so that the driver might alter their driving speed to match or more closely mimic the target speeds along the road segment on which the vehicle is currently traveling, i.e., to reduce the Delta Speed. In one manner of characterizing the differences between these three derived attributes 16, 17, 18, the RRDSL 16 may be considered especially useful for safety calibrations, and so also with the LRRDSL 17 but further in compliance with relevant business logic, while using the OLSP 18 places the emphasis on energy efficiency. It should be reminded that any of these attributes 16, 17, 18 can be vehicle dependent, i.e., a function of vehicle type, class, etc.

Any of the attributes 16, 17, 18, but perhaps especially the OLSP 18, can be used to provide an energy efficient routing option which permits a more energy efficient route to be calculated, offered to and selected by a user in preference to a route calculated according to some other basis such as the fastest or shortest route. For routing purposes, the attribute 16, 17, and/or 18 may be treated on the basis of an assigned count to keep track of the number of accelerations and decelerations above a threshold. This count can then be assigned to a road segment. A routing algorithm could favor segments with high speeds and thus utilize the RRDSL 16 or LRRDSL 17. On a higher level, the routing algorithm may operate by identifying chains of road segments with the overall minimum energy loss by reference to the OLSP 18. These chains of road elements can be identified as efficient corridors. Furthermore, any of the attributes 16, 17, 18 provide an instantaneous performance indicator by offering a reference signal to which real time comparisons can be made so as to advise the driver.

In addition, the subject methods for creating attributes 16, 17, 18 and associating these with the road segments in a digital map can also be used for assessing traffic flow efficiency on various road sections. According to this application, which is diagrammed in FIG. 11, as a vehicle drives various road segments the Delta Speed is measured. Such information can be used to assess whether a particular road segment is fluid or uncongested (i.e., efficient or inefficient). Depending on which attribute 16, 17 or 18 is used, the efficiency (perhaps caused by congestion, road surface condition, obstruction (lane reduction), visibility constraint, etc.) can by characterized. The particular efficiency level or class can also be determined. In the event that the Delta Speed is large, i.e., current speed deviates to a large extent from the target speed provided by the RRDSL 16, LRRDSL 17 or OLSP 18, this could reflect a road segment where there is potentially more traffic than in normal conditions (or bad road conditions, poor visibility, etc.) are providing a congestion-like effect. Such assessments can be enhanced by location-based traffic and/or weather information from other sources. Thus, FIG. 11 represents a schema for traffic flow assessment by a remote traffic centre where the probe data comes from real time connected devices, position information with speed information or high resolution position information out of which speed information can be derived in real time.

Figure 12:
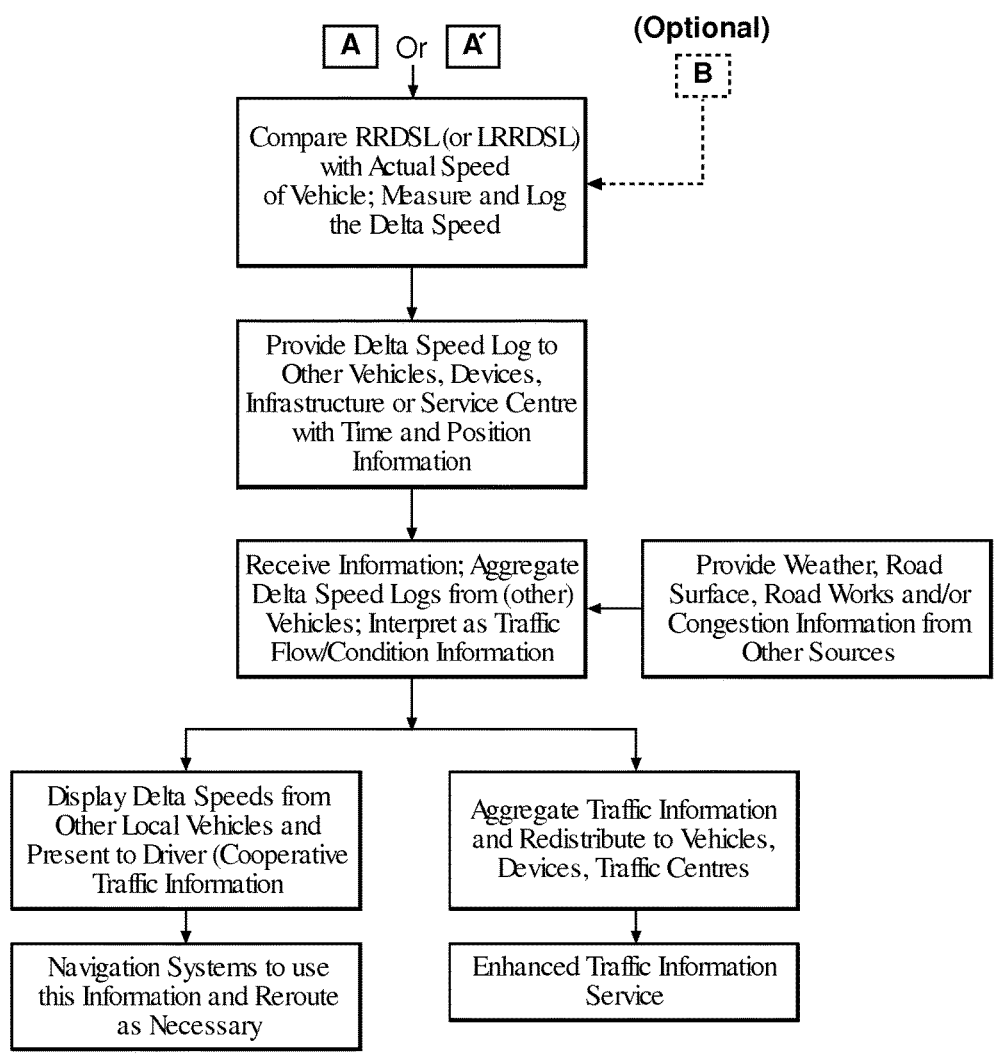
FIG. 12 is a simplified flow diagram showing relationships between creating traffic information and cooperative applications resulting from derivation and use of the RRDSL or LRRDSL.

As shown in more detail in FIG. 12, this traffic flow efficiency assessment may be received by a navigation device 10 for routing purposes, and/or transmitted to a traffic service center via e.g. a GRPS connection, via a local infrastructure Dedicated Short Range Communication receiver or communicated directly or indirectly to a second vehicle driving behind the first vehicle, for example. Preferably it is merged with other information to identify the nature or cause(s) of the efficiency reduction (e.g. weather, visibility, road works). Benefit road works throughput can be increased through such an application, which is otherwise difficult with prior art systems due to non-active equipment during road works. Such details will be potentially useful when shared with other device 10 users under appropriate sharing protocols. This shared information can be communicated by itself or together with update requests or proposals provided to the map suppliers indicating that certain road segments should be updated or modified. Accordingly, the first vehicle, i.e., that which produces the new probe traces, transmits its assessment of the "efficiency" levels to any appropriately enabled receiving device, which could be a traffic service center, a second vehicle via car-to-car communication, and/or to some other interested entity. The first vehicle transmits its "efficiency assessment" and/or simply its speed difference or percentage of RRDSL/LRRDSL/OLSP speed between current speed and optimal speed along the road segment in question. The receiving party in turn can assess the congestion level and whether it is applicable to the driving direction of second vehicle, in the case of direct car-to-car communications. In other words, the party receiving the information can aggregate the Delta Speed Logs from other vehicles and interpret as traffic flow condition information. Additionally, weather, road surface, road works and or congestion information can be received from other sources to enhance the efficiency assessment.

In some circumstances, it may be advantageous to factor the derived Longitudinal Speed Profiles (LSPs) into the procedures for assessing traffic congestion as shown in FIGS. 11 and 12. Likewise, the time-dependent LSP data may also be useful for driving control purposes (see FIG. 10). The LSPs may, for example, influence a predictable reduction in the target speeds at particular longitudinal positions associated with observed school crossings or rush hour traffic patterns.

New emphasis is being provided globally toward the objectives of reducing emissions and energy consumption. The subject invention solves these technical problems by reducing energy loss on a route between two locations by choosing or calculating the most economic route and by providing real time driving instructions to enable a driver to achieve the best possible economy and allow the best real-time balancing of efficiency with safety. Important, real world variables which must be addressed in this context include not only the length of a road segment and the average speed of a particular road segment, but also the elapsed time to get from one end of the road segment to the other, the number of stops, road gradient curves as well as other static and/or dynamic aspects. Ideally, the more constant speed will provide the most efficient fuel economy or route. The subject invention addresses an aggregated solution, not separating routing based on static information and dynamic information (e.g., traffic information). Thus, this invention addresses the data needed to provide efficient routing and driving guidelines. Driving support addresses the driver's control of a vehicle and its effect on fuel economy. This, of course, addresses the dynamic behavior of driving a vehicle in interaction with other traffic. Sensory signals provided by the navigation device to the driver may include choosing a cruising speed, safe distance to the vehicle driving in front influencing the driver to make decisions not to overtake, adaptive driving traits, and the like.

The subject invention intends to both reduce and smooth the number of sharp accelerations, decelerations and stops to benefit energy consumption as well as optimize and influence traffic flow. Furthermore, it is expected that driver comfort will be proportionally improved by minimizing sharp accelerations and reducing the number of stops, etc. This is accomplished by deriving an energy efficient, OLSP 18 describing a practical energy efficient speed distribution along a road segment. The energy efficient OLSP 18 is preferably, but not necessarily, derived for each road segment and is longitudinally or linearly distributed. Alternatively, a group or collection of road segments may be bundled for this purpose. In any event, an RRDSL 16, LRRDSL 17 and/or OLSP 18 can be created for a specific direction of travel. These attributes can be further optimized at a specific moment in time by integrating the LSPs. As the input data relates to historic data, this is reflected in the attributes 16, 17 and 18. This information may be complemented by real time information, such as traffic congestion, temporary road works, weather conditions, surface conditions, and other information from sensors (road surface characteristics) to obtain an adaptive system, e.g., by adding a percentage of the RRDSL, derived from historic data as well.

The steps presented in the Figures and described illustrate various ways in which the derived speed profile information can be used to optimize traffic flow, navigate and route plan, and provide advanced driver assistance. The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A method, comprising:
    collecting probe data from a plurality of probes traversing a multi-lane road segment in the form of vehicular traffic flow, each probe developing a respective probe trace comprising a sequence of discrete time-stamped probe positions and having sufficient resolution to identify particular lanes traversed in the road segment;
    identifying a time span for the road segment with free flow traffic conditions;
    selecting, by a processor, probe data for the road segment collected during the identified time span;
    statistically deriving, by the processor, longitudinally distributed average speeds at positions along the road segment from the selected probe data, the longitudinally distributed average speeds being representative of a free flow speed of vehicular traffic flow along the road segment and velocity variations along a length of the road segment;
    generating, from the longitudinally distributed average speeds, an Optimal Longitudinal Speed Profile (OLSP), the OLSP being a separate speed profile that includes speeds based on the longitudinally distributed average speeds, but with smoothed transitions for accelerations and decelerations in the longitudinally distributed average speeds that improve energy efficiency with respect to the longitudinally distributed average speeds;
    associating, by the processor, the longitudinally distributed average speeds and the OLSP with the road segment; and
    storing the longitudinally distributed average speeds and the OLSP in a digital medium, the storing comprising storing unique longitudinally distributed average speeds for each lane in the road segment.

2. The method of claim 1 further including the step of providing a digital map having at least one link corresponding to the road segment; and said step of storing the longitudinally distributed average speeds includes augmenting the digital map with a data layer containing the stored longitudinally distributed average speeds.

3. The method of claim 1 further including the step of creating a Legal Raw Road Design Speed Limit (LRRDSL) by limiting the longitudinally distributed average speeds with at least one predetermined threshold.

4. The method of claim 3 wherein said step of creating a Legal Raw Road Design Speed limit (LRRDSL) includes using the established speed limit of the road segment as the predetermined threshold.

5. The method of claim 3 wherein the LRRDSL includes an artificial maximum threshold based on fuel economy statistics.

6. The method of claim 1 wherein said step of creating an OLSP includes creating the OLSP on the fly in an in-vehicle application.

7. The method according to claim 1 further including adjusting the longitudinally distributed average speeds on the basis of at least one vehicle specific parameter.

8. The method according to claim 1, wherein the OLSP is derived from kinetic energy simulations for a plurality of vehicle types or categories.

9. The method of claim 1 further comprising using the longitudinally distributed average speeds to advise a driver.

10. The method of claim 1 further comprising enhancing the OLSP using a dynamic real time parameter or coefficient.

11. A navigation device configured to be carried in a vehicle, comprising:
    a position reading device configured to determine the current longitudinal position and speed of a navigation device along a multi-lane road segment, the position reading device having sufficient resolution to identify particular lanes traversed in the road segment; and
    a digital storage medium comprising a digital map having a plurality of links corresponding to road segments traversable by the navigation device, the digital map having a data layer comprising longitudinally distributed average speeds representative of the fastest or free flow speed of vehicular traffic flow at a plurality of positions along each road segment and velocity variations along a length each road segment and an Optimal Longitudinal Speed Profile (OLSP), the OLSP being a separate speed profile for each road segment that includes speeds based on corresponding longitudinally distributed average speeds, but with smoothed transitions for accelerations and decelerations in the corresponding longitudinally distributed average speeds that improve energy efficiency with respect to the corresponding longitudinally distributed average speeds, the stored longitudinally distributed average speeds comprising unique longitudinally distributed average speeds for each lane in the road segment;
    the navigation device being configured to compare the determined current speed to a speed derived from the longitudinally distributed average speeds for: (i) the determined current position; or (ii) a position ahead of the determined current position, and to produce a sensory signal when the determined current speed exceeds the speed derived from the longitudinally distributed average speeds by a predetermined value.

12. The navigation device according to claim 11, wherein the sensory signal includes at least one of: an image on a display screen; an audible sound; and a haptic feedback.

13. The navigation device according to claim 11, wherein the navigation device is configured to communicate with an ADAS application of the vehicle that acts to actively conform the current speed to a speed derived from the longitudinally distributed average speeds.

14. The navigation device according to claim 11, wherein the longitudinally distributed average speeds for a road segment are statically derived from a plurality of probes traversing the road segment in the form of vehicular traffic flow, each probe developing a respective probe trace comprising a sequence of discrete time-stamped prove positions.

15. The navigation device according to claim 11, wherein the speed derived from the longitudinally distributed average speeds is determined on the basis of at least one dynamic real time parameter.

16. The navigation device according to claim 11, wherein the speed derived from the longitudinally distributed average speeds is determined on the basis of at least one vehicle specific parameter.

17. The navigation device according to claim 11, wherein the speed derived from the longitudinally distributed average speeds includes lane specific data related to a direction of travel along the road segment.

18. The navigation device according to claim 11, wherein the determination of when to produce the sensory signal additionally uses dynamic environmental factors.

19. The navigation device according to claim 11, wherein the longitudinally distributed average speeds are attributed to the road segment as one of: a parametric curve in view of a function of distance, a set of discrete optimal speeds between which to linearly interpolate, or normalized variations above and below a legal speed limit or artificial threshold.

20. A non-transitory computer-readable medium which stores a set of instructions which when executed performs a method comprising:

collecting probe data from a plurality of probes traversing a multi-lane road segment in the form of vehicular traffic flow, each probe developing a respective probe trace comprising a sequence of discrete time-stamped probe positions and having sufficient resolution to identify particular lanes traversed in the road segment;

identifying a time span for the road segment with free flow traffic conditions;

selecting probe data for the road segment collected during the identified time span;

statistically deriving longitudinally distributed average speeds at positions along the road segment from the selected probe data, the longitudinally distributed average speeds being representative of a free flow speed of vehicular traffic flow along the road segment and velocity variations along a length of the road segment;

generating, from the longitudinally distributed average speeds, an Optimal Longitudinal Speed Profile (OLSP), the OLSP being a separate speed profile that includes speeds based on the longitudinally distributed average speeds, but with smoothed transitions for accelerations and decelerations in the longitudinally distributed average speeds that improve energy efficiency with respect to the longitudinally distributed average speeds;

associating, by the processor, the longitudinally distributed average speeds and the OLSP with the road segment; and storing the longitudinally distributed average speeds and the OLSP in a digital medium, the storing comprising storing unique longitudinally distributed average speeds for each lane in the road segment.

* * * * *